United States Patent
Lee et al.

(10) Patent No.: US 9,715,139 B2
(45) Date of Patent: Jul. 25, 2017

(54) CURVED DISPLAY DEVICE

(71) Applicant: LG Display Co., Ltd., Seoul (KR)

(72) Inventors: Se-Min Lee, Goyang-si (KR);
Joo-young Yeon, Paju-si (KR);
Yong-Joong Yoon, Paju-si (KR);
Tae-Hyung Kim, Seoul (KR);
Hyo-Sung Lee, Jecheon-si (KR);
Sun-Bok Song, Ansan-si (KR)

(73) Assignee: LG Display Co., Ltd., Seoul (KR)

( * ) Notice: Subject to any disclaimer, the term of this patent is extended or adjusted under 35 U.S.C. 154(b) by 153 days.

(21) Appl. No.: 14/333,097

(22) Filed: Jul. 16, 2014

(65) Prior Publication Data
US 2015/0042920 A1    Feb. 12, 2015

(30) Foreign Application Priority Data
Aug. 6, 2013 (KR) .......................... 10-2013-0093043

(51) Int. Cl.
*G02F 1/1333* (2006.01)
*G02F 1/1335* (2006.01)

(52) U.S. Cl.
CPC .................... *G02F 1/1336* (2013.01); *G02F 2001/133314* (2013.01); *G02F 2001/133317* (2013.01)

(58) Field of Classification Search
CPC ......... G02F 1/133615; G02F 1/133308; G02F 1/133603; G02F 1/133524; G02F 1/1336;
(Continued)

(56) References Cited

U.S. PATENT DOCUMENTS 8,212,970 B2 * 7/2012 Nagata .............. G02F 1/133305
349/158
8,632,239 B2 * 1/2014 Hsiao ...................... H05K 5/02
349/58
(Continued)

FOREIGN PATENT DOCUMENTS

CN        1987611 A     6/2007
CN      101344651 A     1/2009
(Continued)

OTHER PUBLICATIONS

Taiwan Intellectual Property Office, Office Action, Taiwanese Patent Application No. 103126926, Aug. 13, 2015, twelve pages.
(Continued)

*Primary Examiner* — Thoi Duong
(74) *Attorney, Agent, or Firm* — Fenwick & West LLP (57) ABSTRACT

A curved display device comprises a liquid crystal panel; a backlight unit providing light to the liquid crystal panel, the backlight unit including a light guide plate having a curvature. The backlight unit further includes an elastic optical guide member coupled to the light guide plate, the elastic optical guide member having a substantially same curvature as the curvature of the light guide plate. The curved display device further comprises a first frame having a substantially same curvature as the curvature of the elastic optical guide member, the first frame coupled to the backlight unit and configured to support the backlight unit and a reinforcing member having a substantially same curvature as the curvature of the first frame, the reinforcing member coupled to the first frame.

14 Claims, 11 Drawing Sheets

(58) Field of Classification Search
CPC .............. G02F 1/1333; G02F 1/133305; G02F 1/133608; G02F 1/133504; G02F 1/133606; G02F 2001/133317; G02F 2001/133314; G02F 2001/13332; G02F 2001/133325; G02F 2001/133322; G02F 2001/133328; G02F 2201/46; G02F 2201/50; G02F 2201/503; G02F 2201/465; G02B 6/0088; G02B 6/0023; G02B 6/005; G02B 6/0051; G02B 6/0011; G02B 6/0028; G02B 6/0025; G02B 6/0053; G02B 6/0066; G02B 6/00; H01L 2251/5338; H01L 23/4985; H01L 27/1218; F21V 15/012; F21V 2200/20; H04N 5/64; H04N 5/645; H04N 5/2254; H04N 5/2256; H04N 5/655
USPC .... 349/58, 65, 61, 62, 67, 150, 158, 60, 64; 362/97.1, 615, 633, 634; 348/790, 794, 348/335, 836; 361/752
See application file for complete search history.

(56) References Cited

U.S. PATENT DOCUMENTS 8,820,953 B2* 9/2014 Kuo ........................ H05K 5/02
362/382
2007/0195219 A1* 8/2007 Moon ................... G06F 1/1626
349/58
2013/0128143 A1* 5/2013 Kuo ................. G02F 1/133608
349/15
2013/0329162 A1* 12/2013 Fujii ....................... H05K 7/14
349/58

FOREIGN PATENT DOCUMENTS

| CN | 201421691 Y | 3/2010 |
| --- | --- | --- |
| CN | 101915999 A | 12/2010 |
| CN | 102042542 A | 5/2011 |
| CN | 102243390 A | 11/2011 |
| CN | 102494306 A | 6/2012 |
| JP | H06-347772 A | 12/1994 |
| JP | H11-149263 A | 6/1999 |
| TW | 200938903 A | 9/2009 |

OTHER PUBLICATIONS

State Intellectual Property Office of the People's Republic of China, First Office Action, Chinese Patent Application No. 201410381945.2, Aug. 22, 2016, fourteen pages.
Taiwan Intellectual Property Office, Office Action, Taiwanese Patent Application No. 103126926, May 25, 2016, eighteen pages.

* cited by examiner

FIG. 1
RELATED ART

Main viewing point

CURVED DISPLAY DEVICE

CROSS-REFERENCE TO RELATED APPLICATIONS

The present application claims the benefit of Korean Patent Application No. 10-2013-0093043 filed in Korea on Aug. 6, 2013, which is hereby incorporated by reference.

BACKGROUND

Field of Technology

The embodiments herein relate to a display device and more particularly to a curved display device having a curved shape.

Discussion of the Related Art

As society has entered in earnest upon an information age, various display devices for displaying images are required.

Among these devices, flat panel display devices, such as a liquid crystal display (LCD) device, a plasma display panel (PDP) and an organic light emitting diode (OLED) display device, have excellent capabilities of a thin profile, light weight and low power consumption, and so on, and are widely researched and used instead of a cathode ray tube (CRT).

Figure 1:
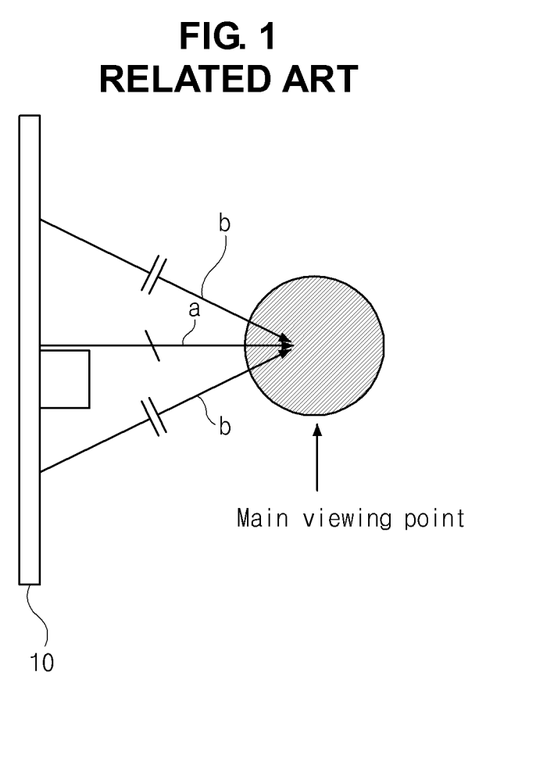
FIG. 1 shows the related art LCD device.

However, referring to FIG. 1, which shows the related art LCD device, there is a difference between a first distance "a" from a main viewing point to a center of the LCD device 10 and a second distance "b" from the main viewing point to a side of the LCD device 10. Namely, there is a distance deviation in the flat type display device.

SUMMARY

Accordingly, the embodiments herein are directed to a curved display device that substantially obviates one or more of the problems due to limitations and disadvantages of the related art.

An object of the embodiments herein is to provide a curved display device being capable of preventing a distance deviation.

A curved display device comprises a liquid crystal panel; a backlight unit providing light to the liquid crystal panel, the backlight unit including a light guide plate having a curvature, the light guide plate processing the light from the backlight unit from a first type of light to a second type of light that is received by the liquid crystal panel. The backlight unit further includes an elastic optical guide member coupled to the light guide plate, the elastic optical guide member having a substantially same curvature as the curvature of the light guide plate. The curved display device further comprises a first frame having a substantially same curvature as the curvature of the elastic optical guide member, the first frame coupled to the backlight unit and configured to support the backlight unit and a reinforcing member having a substantially same curvature as the curvature of the first frame, the reinforcing member coupled to the first frame.

A curved display device comprises a liquid crystal panel; a backlight unit providing light to the liquid crystal panel; a frame having a curvature, the frame coupled to the backlight unit and configured to support the backlight unit; a circuit board member coupled to the frame. The circuit board member includes a circuit board and a connection part having a first end connected to the circuit board and a second end connected to the frame. The curved display device further comprises a reinforcing member having a substantially same curvature as the curvature of the frame, the reinforcing member coupled to the frame.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, the embodiments herein provide a curved display device including a liquid crystal panel; a backlight unit providing a light on the liquid crystal panel; a bottom frame supporting the backlight unit; and a reinforcing member combined with the bottom frame and having a curvature.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION

Reference will now be made in detail to the various embodiments, examples of which are illustrated in the accompanying drawings.

The same references number is used for the same element in different drawings. The terms of "first", "second", and so on, are used for illustrating various elements, while the elements are not limited by the terms. The terms are used for distinguishing one element from other elements.

Figure 2:
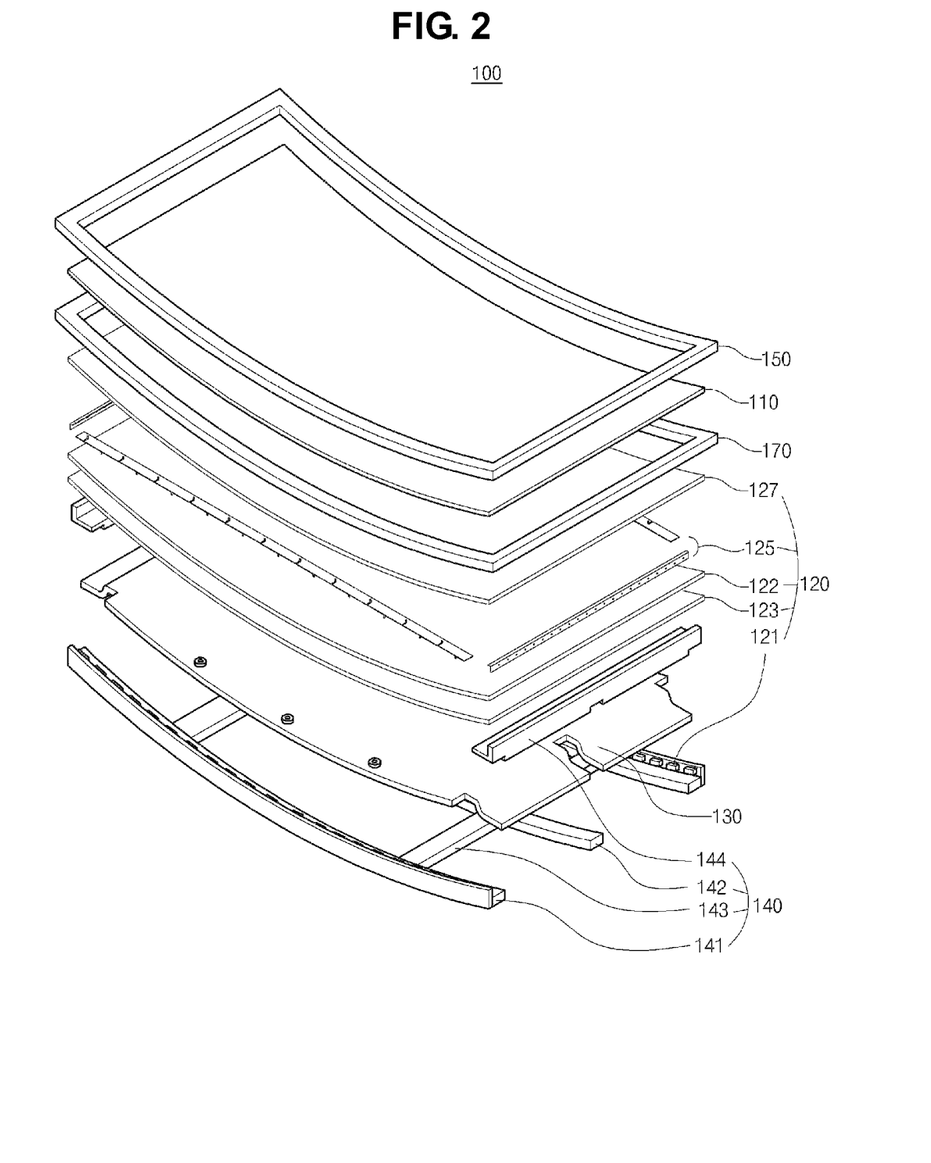
FIG. 2 is an exploded perspective view of a curved display device according to one embodiment.

FIG. 2 is an exploded perspective view of a curved display device according to one embodiment.

As shown in FIG. 2, a curved display device 100 includes a liquid crystal panel 110, a backlight unit 120 providing light toward the liquid crystal panel 110, a bottom frame 130 (i.e., a first frame) supporting the backlight unit 120, and a reinforcing member 140 combined with the bottom frame 130 and having a pre-determined curvature.

The backlight unit 120 may include a light source 121, a light guide plate 122, a reflective member 123, an optical guide member 125, and an optical sheet 127.

Figure 3:
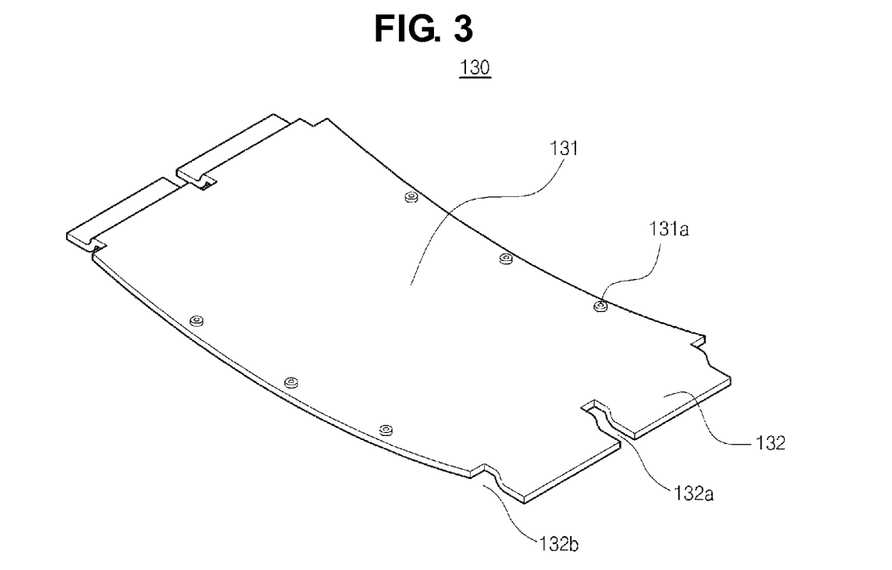
FIG. 3 is a perspective view of a bottom frame of a curved display device according to one embodiment.

Referring to FIG. 3, which is a perspective view of the bottom frame 130 of the curved display device 100 according to one embodiment, the bottom frame 130 includes a center portion 131 and a side portion 132 at both sides of the center portion 131.

The center portion 131 supports the backlight unit 120, the side portion 132 is formed to be oblique to the center portion 131.

A plurality of holes 131a are formed in the center portion 131 of the bottom frame 130. A connection member such as a screw is inserted into the plurality of holes 131a such that the reinforcing member 140 having the pre-determined curvature and the bottom frame 130 are attached to one another. In addition, a first groove 132a and 132b are formed in the side portion 132 to attach to the reinforcing member 140. Since the bottom frame 130 is attached to and fixed to the reinforcing member 140 having the curvature, the bottom frame 130 is curved by a pre-determined curvature.

Figure 4:
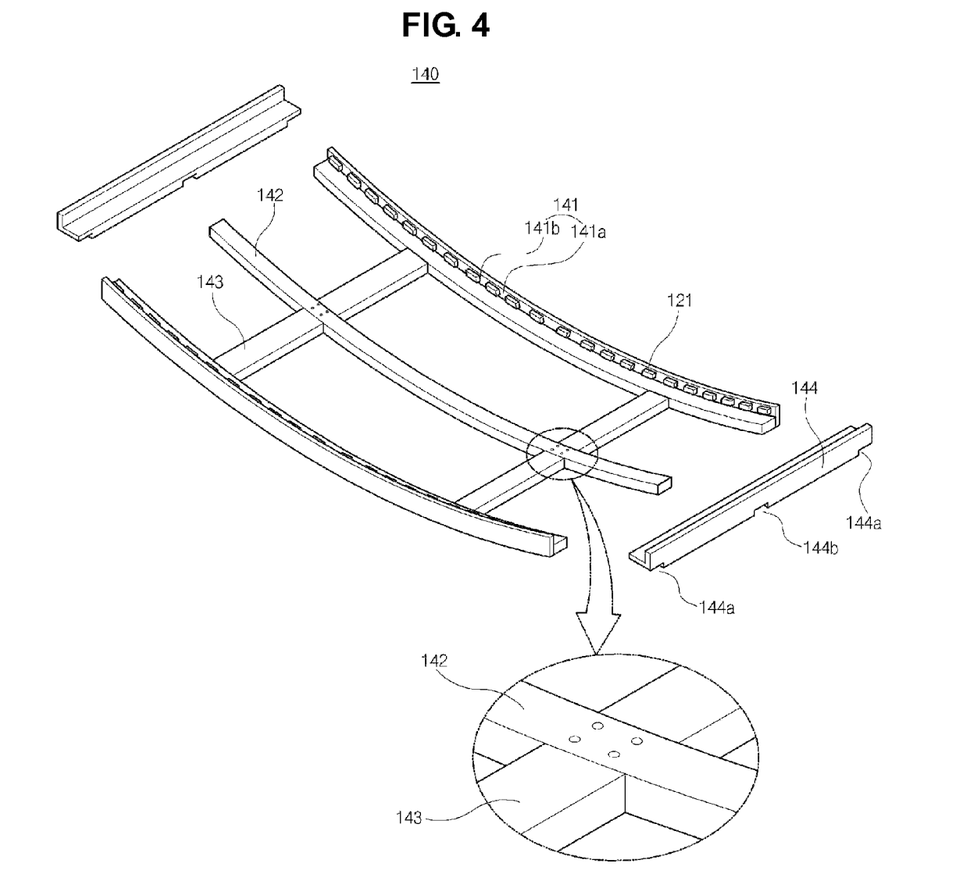
FIG. 4 is a perspective view of a reinforcing member of a curved display device according to one embodiment.

Referring to FIG. 4, which is a perspective view of the reinforcing member 140 of the curved display device 100 according to one embodiment, the reinforcing member 140 including a housing 141, a horizontal reinforcing part 142, a vertical reinforcing part 143, and a side reinforcing part 144.

The light source 121 for providing the light onto the liquid crystal panel 110 is arranged on the housing 141, and the housing 141 has a curved shape. Namely, the housing 141 includes a side surface 141a, where the light source 121 is arranged, and a bottom surface 141b supporting the bottom frame 130. Both the side surface 141a and the bottom surface 141b have the curved shape. The side surface 141a and the bottom surface 141b are formed by one-body. That is, the side surface 141a and the bottom surface 141b are a single component. Alternatively, the side surface 141a and the bottom surface 141b are separate components that are attached together to form the housing 141.

The horizontal reinforcing part 142 also has a curved shape. The curvature of the horizontal reinforcing part 142 may be equal to the curvature of the housing 141 and substantially parallel to the housing 141. FIG. 4 shows one horizontal reinforcing part 142 between a pair of the housings 141. However, there may be two or more horizontal reinforcing parts 142 depending on a size of the bottom frame 130.

The vertical reinforcing part 143 supports and connects the housing 141 and the horizontal reinforcing part 142. The vertical reinforcing part 143 crosses, e.g., perpendicularly, the housing 141 and the horizontal reinforcing part 142.

Figure 5:
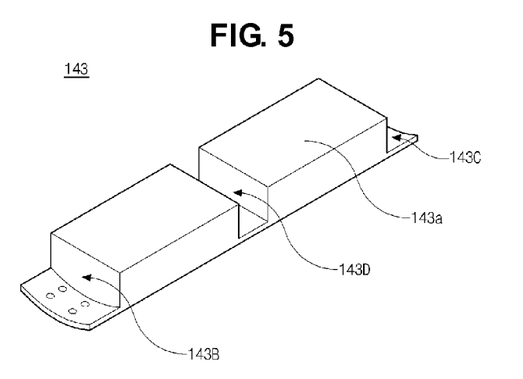
FIG. 5 is a perspective view of a vertical reinforcing part of a curved display device according to one embodiment.

Referring to FIG. 5, which is a perspective view of the vertical reinforcing 143 part of the curved display device 100 according to one embodiment. The vertical reinforcing part 143 may include a horizontal part 143a, a first groove, 143B, a second groove 143C and a third groove 143D.

The first groove 143B, second groove 143C and the third groove 143D are recessed portions of the horizontal part 143a. The first groove 143B is positioned at a first end of the vertical reinforcing part 143 and the second groove 143C is positioned at a second end of the vertical reinforcing part 143 for the housing 141. The third groove 143D is positioned between the first groove 143B and the second groove 143C such as at a center of the vertical reinforcing part 143 for the horizontal reinforcing part 142. Namely, the housing 141 and the horizontal reinforcing part 142 are combined with the vertical reinforcing part 143 in the second and third grooves 143b and 143c, respectively.

A depth of the first groove 143B and the second groove 143C is substantially equal to a thickness of the bottom surface 141b of the housing 141, and a depth of the third groove 143D is substantially equal to a thickness of the horizontal reinforcing part 142. A number of the third groove 143D is set to be equal to a number of the horizontal reinforcing part 142.

Referring to FIGS. 2 and 4, the side reinforcing part 144 is combined with the housing 141 and the horizontal reinforcing part 142 from a side direction of the bottom frame 130. The side reinforcing part 144 includes fourth and fifth grooves 144a and 144b at a lower surface. The fifth groove 144b is positioned between the pair of the fourth groove and fifth grooves 144a and 144b.

The housing 141 is combined with the fourth groove 144a, and the horizontal reinforcing part 142 is combined with the fifth groove 144b. In more detail, the bottom surface 141b of the housing 141 is combined with the fourth groove 144a at both sides of the side reinforcing part 144. The total number of fifth grooves 144b is equal to the total number of horizontal reinforcing parts 142 in the reinforcing member 140.

The backlight unit 120 includes the light source 121, the light guide plate 122, the reflective member 123, the optical guide member 125, and the optical sheet 127.

In more detail, referring to FIGS. 2 and 4, the light source 121 is attached on the side surface 141a of the housing 141 and includes a LED array for providing the light onto the liquid crystal panel 110.

The light guide plate 122 corresponds to the light source 121 and processes a dot type light source from the light source 121 into a plane type light source. The light guide plate 122 is accommodated in the bottom frame 130.

Since the bottom frame 130, which accommodates the light guide plate 122 therein, has a curved shape by being combined with the reinforcing member 140, the light guide plate 122 also has a curved shape. The curvature of the light guide plate 122 may be equal to the curvature of the reinforcing member 140.

The reflective member 123 is disposed under the light guide plate 122. Namely, the reflective member 123 is disposed between the light guide plate 123 and the bottom frame 130 such that the light leaked from the light guide plate 122 is reflected by the reflective member 123 toward the liquid crystal panel 110.

Since the light guide plate 122 and the reflective member 123 are combined in the bottom frame 130, which is combined with the reinforcing member 140 having a pre-determined curvature, the light guide plate 122 and the reflective member 123 may be curved to have a curvature being substantially equal to the curvature of the reinforcing member 140 and the bottom frame 130.

The optical guide member 125 is combined on an upper side of the light guide plate 122 such that a part of the optical guide member 125 may be curved to have a pre-determined curvature.

Figure 6:
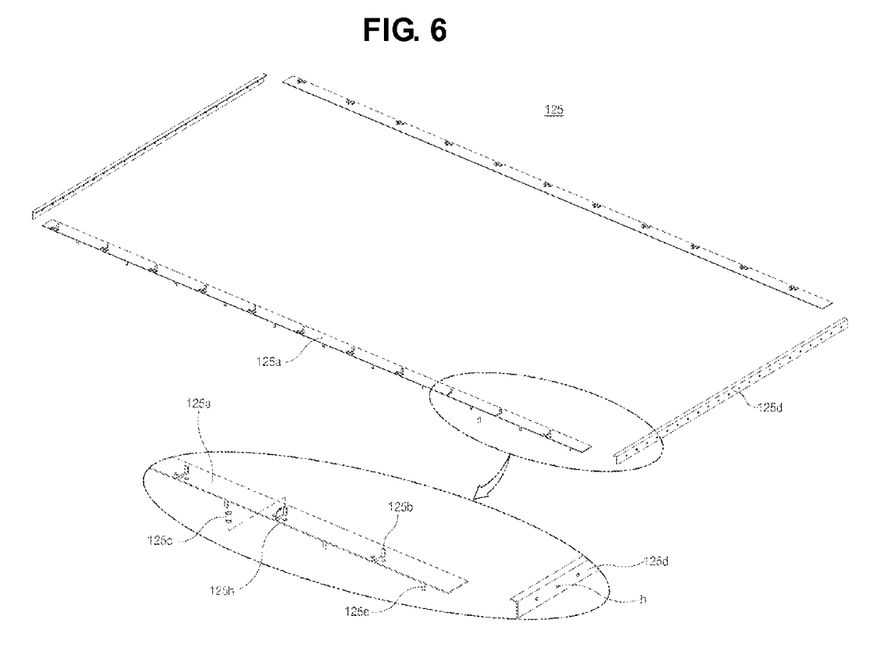
FIG. 6 is a perspective view of an optical guide member of a curved display device according to one embodiment.

Namely, referring to FIG. 6, which is a perspective view of an optical guide member 125 of the curved display device 100 according to one embodiment, the optical guide member 125 includes a guide plate 125*a*, a cover part 125*c*, and an auxiliary guide plate 125*d*.

Referring to FIG. 2, the guide plate 125*a* and the auxiliary guide plate 125*d* are combined with the light guide plate 122 along upper edges of the light guide plate 122.

In more detail, referring to FIGS. 2 and 6, since the guide plate 125*a* are positioned at and combined with the upper edge of a light-incident side or an opposite side (i.e., a light-refracting side) of the light guide plate 122, the guide plate 125*a* may be curved to have a pre-determined curvature.

The guide plate 125*a* includes a sheet supporting part 125*b* and a guide part 125*e*. The sheet supporting part 125*b* protrudes from the guide plate 125*a* toward the optical sheet 127. When the sheet supporting part 125*b* is formed as one-body with the guide plate 125*a*, an outside portion, not an inside portion, of the guide plate 125*a* is processed to be bent. Namely, as shown by an arrow in an enlarged part of FIG. 6, a portion at a side of the guide plate 125*a* facing the top frame 150 (of FIG. 2) (i.e., a second frame) or the main frame 170 (of FIG. 2) (i.e., a third frame) is processed to form the sheet supporting part 125*b*.

When the sheet supporting part 125*b* is formed by processing the inside portion of the guide plate 125*b*, which is positioned at the light-incident side of the light guide plate 122, there may be light leakage through the cut portion of the guide plate 125*a*. However, since the sheet supporting part 125*b* is formed by processing the outside portion of the guide plate 125*b*, the light leakage problem is not generated.

The guide part 125*e* is formed to guide the guide plate 125*a* onto the upper edge of the light guide plate 122.

In addition, a plurality of through-holes 125*h* may be formed in the guide plate 125*a*. The guide plate 125*a* and the housing 141 of the reinforcing member 140 are attached together using a fixing member, e.g., screw, through the through-hole 125*h*.

The auxiliary guide plate 125*d* are positioned at and combined with the other two edges of the light guide plate 122. Namely, a pair of the guide plates 125*a* is connected to a pair of the auxiliary guide plates 125*d*.

Referring again to FIG. 6, the auxiliary guide plate 125*d* has a "⌐" shape in a cross-section. Namely, the auxiliary guide plate 125*d* includes a horizontal portion covering the upper edge of the light guide plate 122 and a side portion vertically extending from the horizontal portion along a direction to the bottom frame 130.

In addition, a plurality of holes "h" may be formed at the side portion of the auxiliary guide plate 125*d*. The auxiliary guide plate 125*d* and the side reinforcing part 144 of the reinforcing member 140 are combined using a fixing member, e.g., screw, through the hole "h".

The cover part 125*c* is attached to the sheet supporting part 125*b* to surround the outer circumference surface of the sheet supporting part 125*b*. For example, the cover part 125*c* may be formed of an elasticity material, e.g., rubber or silicon.

Accordingly, even though the optical sheet 127 is combined with the sheet supporting part 125*b*, which is formed of a metallic material, the damage on the optical sheet 127 is prevented due to the cover part 125*c* covering the sheet supporting part 125*b*.

Figure 7:
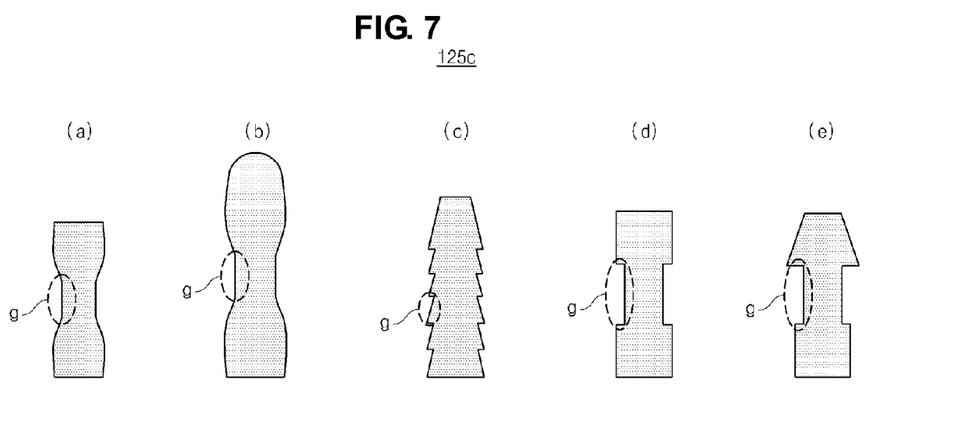
FIG. 7 shows a shape of a cover member of a curved display device according to one embodiment.

Referring to FIG. 7, shows various shapes of a cover part 125*c* of a curved display device 100 according to one embodiment. In one embodiment, a groove "g" or a step may be formed at an outer circumference surface of the cover part 125*c*. A side of the optical sheet 127 is inserted into the groove "g" or the step.

For example, as shown in FIGS. 7(*a*) to 7(*e*), the cover part 125*c* may have a various shape of a dumbbell shape or a tree shape. FIGS. 7(*a*), 7(*b*), 7(*d*), and 7(*e*) are examples of the dumbbell shape whereas FIG. 7(*c*) is an example of a tree shape. As long as there is the groove "g" or the step at the outer circumference surface of the cover part 125*c*, the specific shape of the cover part 125*c* is not limited thereto.

By inserting the optical sheet 127 into the groove "g" or the step of the cover part 125*c*, the optical sheet 127 is accurately fixed to the sheet supporting part 125*b*.

In addition, since the optical sheet 127 is fixed to the sheet supporting part 125*b*, movement of the optical sheet 127 by an outer impact is prevented.

The optical sheet 127 is disposed on the optical guide member 125. The light provided from the light guide plate 122 is concentrated and diffused toward the liquid crystal panel 110 by the optical sheet 127.

Figure 8:
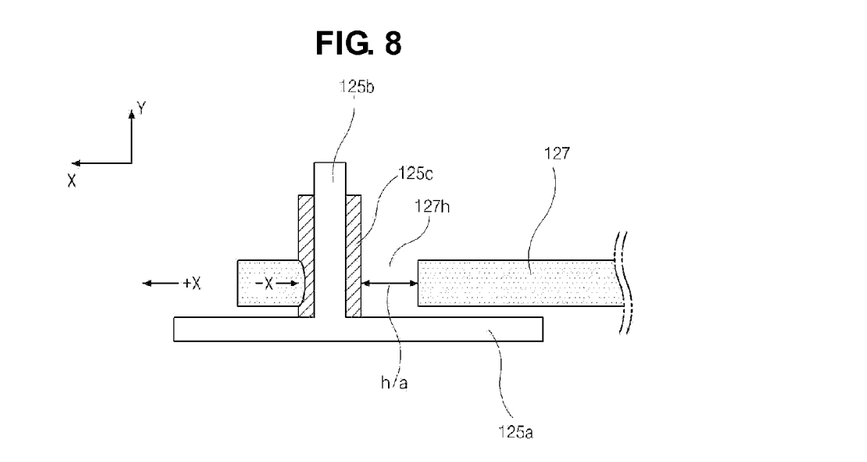
FIG. 8 is a cross-sectional view showing an optical sheet and an optical guide member of a curved display device according to one embodiment.
Figure 9:
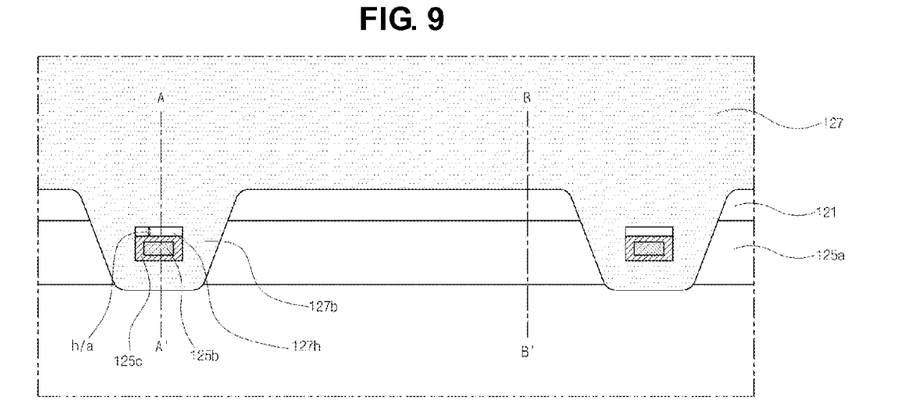
FIG. 9 is a plane view showing an optical sheet and an optical guide member of a curved display device according to one embodiment.

In more detail, referring to FIG. 8, which is a cross-sectional view showing the optical sheet 127 and the optical guide member 125 of the curved display device 100 according to one embodiment, and FIG. 9, which is a plane view showing the optical sheet 127 and the optical guide member 125 of the curved display device 100 according to one embodiment. The optical sheet 127 includes a sheet protruding portion 127*b* extending from a side of the optical sheet 127 and having a through-hole 127*h*.

The sheet supporting part 125*b*, which is covered by the cover part 125*c*, is inserted into the through-hole 127*h* in the sheet protruding portion 127*b*. Namely, the sheet protruding portion 127*b* is combined with the sheet supporting part 125*b* covered by the cover part 125*c*.

Referring to FIG. 8, since the cover part 125*c* is formed of the elasticity material, the cover part 125*c* is suppressed by the sheet protruding portion 127*b* and the sheet protruding portion 127*b* is inserted into the groove "g" (of FIGS. 7A to 7D) or the step of the cover part 125*c*.

In addition, there is a heat allowance space "h/a" between the cover part 125*c* covering the sheet supporting part 125*b* and the sheet protruding portion 127*b* of the optical sheet 127. Accordingly, even when the optical sheet 127 is thermally expanded along a (+X) direction by the light source 121 (of FIG. 2), the damage on the optical sheet 127 is prevented. Namely, when the optical sheet 127 is thermally expanded along the (+X) direction, tension is generated along a (−X) direction such that the damage such as a sheet wrinkle problem on the optical sheet 127 by contacting with the sheet supporting part 125*b* is prevented due to the heat allowance space "h/a".

On a front side of the liquid crystal panel 110, the top frame 150 having the same curvature as the reinforcing member 140 is formed. The top frame 150 covers front edges of the liquid crystal panel 110.

Figure 10A:
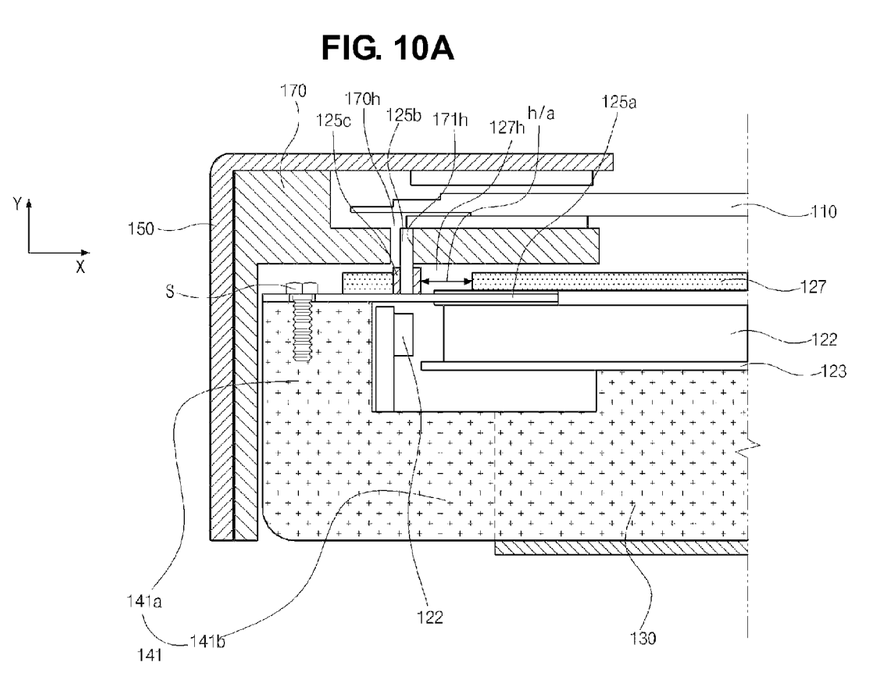
FIGS. 10A and 10B are cross-sectional views of a curved display device according to one embodiment.
Figure 10B:
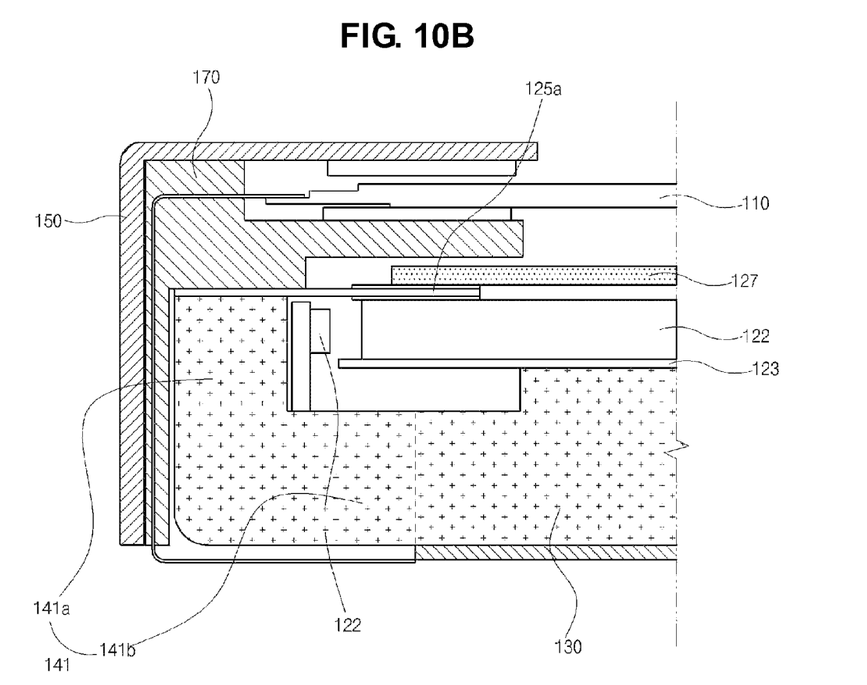

FIGS. 10A and 10B are cross-sectional views of the curved display device according to one embodiment. FIG. 10A is a cross-sectional view taken along the line of A-A' in FIG. 9, and FIG. 10B is a cross-sectional view taken along the line of B-B' in FIG. 9.

Referring to FIG. 10A, the main frame 170 is combined the optical guide member 125, which is combined with the optical sheet 127, and supports the liquid crystal panel 110. The main frame 170 includes an accommodation part 170h corresponding to the sheet supporting part 125b of the optical guide member 125. When the sheet supporting part 125b is accommodated in the accommodation part 125b, the sheet supporting part 125b is positioned to contact an inner side surface 171h of the accommodation part 170h.

Namely, the optical sheet 127 contacts the cover part 125c at one side of the sheet supporting part 125b, while the main frame 170 contacts the other side of the sheet supporting part 125b.

When the curved display device 100 becomes larger, there is a force along a "+X" direction at a lower portion of the sheet supporting part 125b because of a weight of the optical sheet 127. However, the main frame 170 supports an upper portion of the sheet supporting part 125b along a (−X) direction, a problem of deformation or breakage of the sheet supporting part 125 is prevented.

On the other hand, the fixing member such as a screw "s" is combined with the through-hole 125h of the guide plate 125a such that the guide plate 125a and the housing 141 of the reinforcing member 140 are attached.

Referring to FIG. 10B, a portion of the guide plate 125a without the sheet supporting part 125b supports the optical sheet 127. In addition, a space between the main frame 170 and the housing 141 is sealed by the portion of the guide plate 125 without the sheet supporting part 125b such that a light leakage of the light from the light source 121 toward an outer side of the backlight unit 120 is prevented.

A circuit board member including a plurality of electronic components may be combined on a rear surface of the bottom frame 130. It will be explained with reference to FIGS. 11 to 13B.

Figure 11:
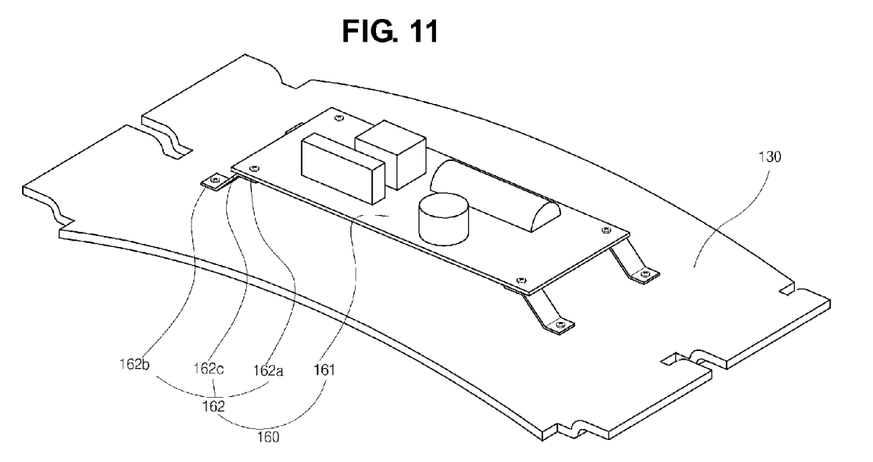
FIG. 11 is a perspective view of a circuit board member and a bottom frame of a curved display device according to one embodiment.
Figure 12:
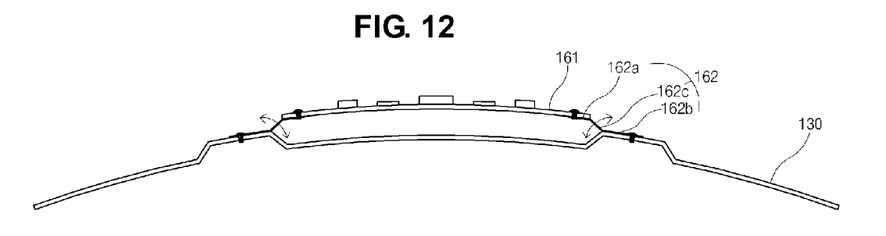
FIG. 12 is a cross-sectional view of a circuit board member and a bottom frame of a curved display device according to one embodiment.
Figure 13A:
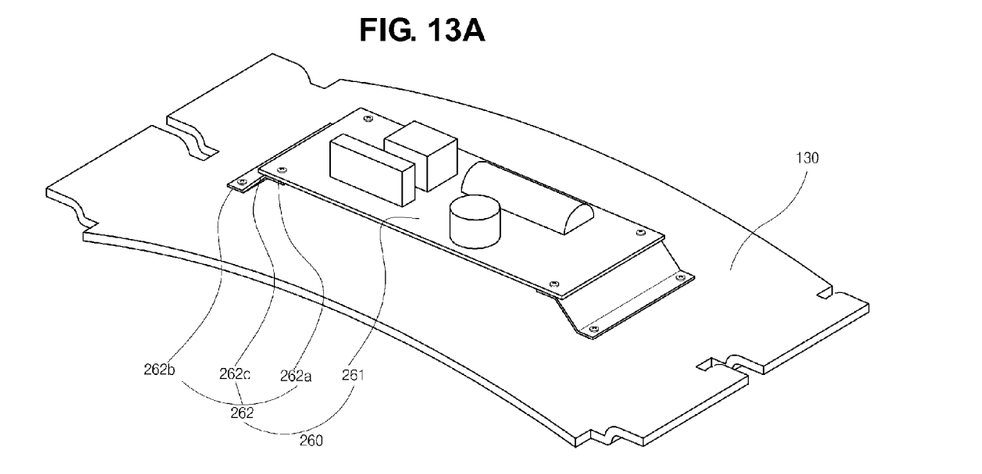
FIGS. 13A and 13B are perspective view showing a circuit board member and a bottom frame of a curved display device according to one embodiment.
Figure 13B:
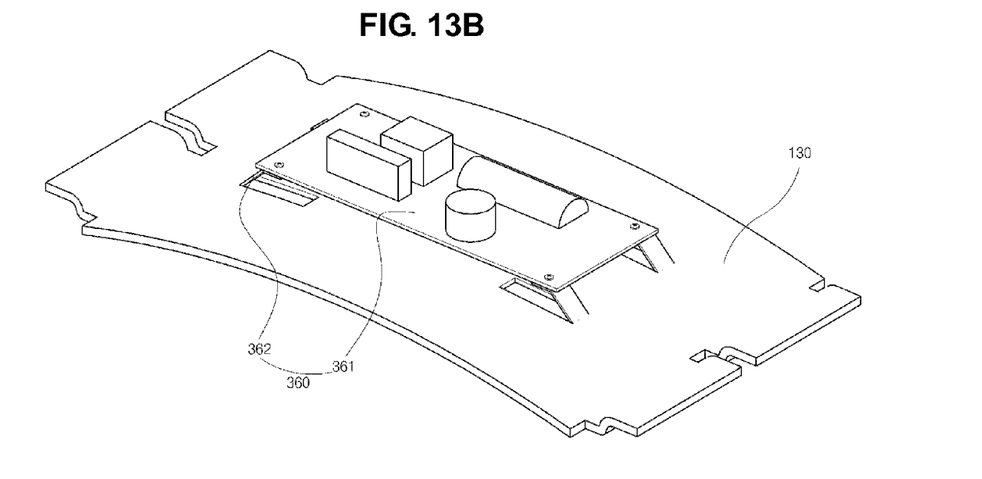

FIG. 11 is a perspective view of a circuit board member and the bottom frame 130 of the curved display device 100 according to one embodiment. FIG. 12 is a cross-sectional view of a circuit board member and the bottom frame 130 of the curved display device 100 according to one embodiment. FIGS. 13A and 13B are perspective view showing a circuit board member and the bottom frame 130 of the curved display device 100 according to one embodiment.

Referring to FIG. 11, the circuit board member 160, which is attached to the rear surface of the bottom frame 130, includes a circuit board 161 and a connection part 162.

The circuit board 161 may be a flat printed circuit board (PCB) or a flexible PCB (FPCB). The plurality of electronic components are installed on the circuit board 161.

One end of the connection part 162 is combined with the circuit board 161 using a fixing member such as a screw, and the other end of the connection part 162 is combined with the bottom frame 130.

In more detail, the connection part 162 includes a first supporting portion 162a, a second supporting portion 162b, and a main body 162c. The first supporting portion 162a is attached to the circuit board 161, and the second supporting portion 162b is attached to the bottom frame 130. The main body 162c connects the first supporting portion 162a and the second supporting portion 162b and is formed of an elastic metallic material. As a result, as shown in FIG. 12, the main body 162c can be flexibly curved along the curvature of the main frame 130.

Referring to FIG. 13A, a shape of the first supporting portion 262a supporting the circuit board 261, the second supporting portion 262b attached to the bottom frame 130 and the main body 262c is variously modified to improve a combining strength between the circuit board member 260 and the main frame 130. Namely, two connection parts 162 are disposed at one side of the circuit board 161 as shown in FIG. 11, or one connection parts 162 is disposed at one side of the circuit board 161 as shown in FIG. 13A.

Alternatively, as shown in FIG. 13B, a portion of the bottom frame 130 is cut and bent toward the circuit board member 360 such that the portion of the bottom frame 130 as the connection part 362 supports the circuit board 361. Namely, the connection part 362 extends from the bottom frame 130 to support the circuit board 361.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A curved display device comprising:
    a liquid crystal panel;
    a backlight unit providing light to the liquid crystal panel, the backlight unit including:
        a light guide plate having a curvature, the light guide plate processing the light from the backlight unit from a first type of light to a second type of light that is received by the liquid crystal panel; and
        an elastic optical guide member having a substantially same curvature as the curvature of the light guide plate, the elastic optical guide member including a plurality of guide plates that are each connected to a corresponding edge of a first surface of the light guide plate that is closer to the liquid crystal panel than a second surface of the light guide plate that is opposite the first surface of the light guide plate;
    a first frame having a substantially same curvature as the curvature of the elastic optical guide member, the first frame coupled to the backlight unit and configured to support the backlight unit;
    a circuit board over a surface of the first frame;
    a first connection part at a first side of the circuit board and having a first end connected to the first side of the circuit board and a second end connected to the first frame; and
    a second connection part at a second side of the circuit board opposite to the first side and having a third end connected to the opposite side of the circuit board and a fourth end connected to the first frame;
    a reinforcing member having a substantially same curvature as the curvature of the first frame, the reinforcing member coupled to the first frame,
    wherein the circuit board is coupled to the first frame by the first and second connection parts, and an entire surface of the circuit board between the first end and the third end directly faces the surface of the first frame.

2. The curved display device of claim 1, wherein the reinforcing member comprises:
    a plurality of housings, each of the plurality of housings having a substantially same curvature as the curvature of the first frame and including a side surface and a bottom surface, the bottom surface of the plurality of housings configured to support the first frame;
    a first reinforcing part between the plurality of housings and substantially parallel to the plurality of housings, the first reinforcing part having a substantially same curvature as the curvature of the first frame;

a plurality of second reinforcing parts between the plurality of housings and substantially perpendicular to the plurality of housings and the first reinforcing part, each of the plurality of second reinforcing parts connecting together the plurality of housings and the first reinforcing part; and a plurality of third reinforcing parts substantially perpendicular to the plurality of housings and the first reinforcing part, each the plurality of third reinforcing parts connecting together ends of the plurality of housings and the first reinforcing part.

3. The curved display device of claim 2, wherein each of the plurality of second reinforcing parts includes:

a first groove at a first end of the second reinforcing part;

a second groove at a second end of the second reinforcing part; and a third groove located between the first end and the second end of the second reinforcing part;

wherein the first groove of each of the plurality of second reinforcing parts is coupled to one of the plurality of housings and the second groove of each of the plurality of second reinforcing parts is coupled to another one of the plurality of housings; and wherein the third groove of each of the plurality of second reinforcing parts is coupled to the first reinforcing part.

4. The curved display device of claim 2, wherein each of the plurality of third reinforcing parts includes:

a first groove at a first end of the third reinforcing part;

a second groove at a second end of the third reinforcing part; and a third groove located between the first end and the second end of the third reinforcing part;

wherein the first groove of each of the plurality of third reinforcing parts is coupled to an end of one of the plurality of housings and the second groove of each of the plurality of third reinforcing parts is coupled to an end of another one of the plurality of housings; and wherein the third groove of each of the plurality of third reinforcing parts is coupled to an end of the first reinforcing part.

5. The curved display device of claim 2, wherein the backlight unit further comprises:

a light source generating the first type of light, the light source coupled to the side surface of one of the plurality of housings;

a reflective member between the light guide plate and the first frame, the reflective member reflecting light leaked from the light guide plate and having a substantially same curvature as the reinforcing member; and an optical sheet disposed on the elastic optical guide member.

6. The curved display device of claim 5, wherein the elastic optical guide member includes:

a guide plate coupled to an edge of the light guide plate; and an auxiliary guide plate coupled to another edge of the light guide plate that is substantially perpendicular to the edge of the light guide plate coupled to the guide plate.

7. The curved display device of claim 6, wherein the auxiliary guide plate includes a horizontal portion and a vertical portion that is substantially perpendicular to the horizontal portion.

8. The curved display device of claim 7, wherein the vertical portion includes a plurality of holes and wherein the vertical portion of the auxiliary guide plate is coupled to the reinforcing member using fasteners through the plurality of holes.

9. The curved display device according to claim 6, wherein the guide plate includes:

a sheet supporting part protruding from the guide plate toward the optical sheet; and a guide part protruding from the guide plate toward the light guide plate.

10. The curved display device according to claim 9, wherein the elastic optical guide member further includes:

a cover part surrounding an outer circumference of the sheet supporting part.

11. The curved display device according to claim 10, wherein the cover part is elastic and includes a groove around an outer circumference of the cover part and wherein a side of the optical sheet is inserted into the groove.

12. The curved display device according to claim 9, wherein the optical sheet includes:

a portion that protrudes from a side of the optical sheet, the portion including a hole, and wherein the sheet support part of the guide plate is inserted into the hole.

13. The curved display device of claim 1, further comprising:

a second frame covering edges of the liquid crystal panel, the second frame having a substantially same curvature as the reinforcing member; and a third frame supporting the liquid crystal panel.

14. A curved display device comprising:

a liquid crystal panel;

a backlight unit providing light to the liquid crystal panel, the backlight unit including:

a light guide plate having a curvature, the light guide plate processing the light from the backlight unit from a first type of light to a second type of light that is received by the liquid crystal panel; and an elastic optical guide member coupled to the light guide plate, the elastic optical guide member having a substantially same curvature as the curvature of the light guide plate;

a first frame having a substantially same curvature as the curvature of the elastic optical guide member, the first frame coupled to the backlight unit and configured to support the backlight unit; and a reinforcing member having a substantially same curvature as the curvature of the first frame, the reinforcing member coupled to the first frame, wherein the first frame includes:

a center portion configured to support the backlight unit and having the substantially same curvature as the curvature of the light guide plate and the curvature of the elastic optical guide member;

a first side portion at a first side of the center portion and oblique to the center portion, the first side portion including a first groove coupling the first frame to the reinforcing member; and a second side portion at a second side of the center portion and oblique to the center portion, the second side portion including a second groove coupling the first frame to the reinforcing member.

* * * * *